(12) United States Patent
Vegas Morales et al.

(10) Patent No.: US 11,178,892 B2
(45) Date of Patent: *Nov. 23, 2021

(54) COATED LEGUME-BASED FOOD PRODUCTS

(71) Applicant: Mars, Incorporated, McLean, VA (US)

(72) Inventors: Cesar Vegas Morales, Veghel (NL); Amy Dombroski, Hackettstown, NJ (US)

(73) Assignee: Mars, Incorporated, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/068,775

(22) PCT Filed: Jan. 13, 2017

(86) PCT No.: PCT/US2017/013524
§ 371 (c)(1),
(2) Date: Jul. 9, 2018

(87) PCT Pub. No.: WO2017/124009
PCT Pub. Date: Jul. 20, 2017

(65) Prior Publication Data
US 2019/0021375 A1 Jan. 24, 2019

Related U.S. Application Data

(60) Provisional application No. 62/278,251, filed on Jan. 13, 2016.

(51) Int. Cl.
*A23L 11/00* (2021.01)
*A23P 20/20* (2016.01)
*A23L 11/10* (2016.01)

(52) U.S. Cl.
CPC ............... *A23L 11/07* (2016.08); *A23L 11/01* (2016.08); *A23L 11/03* (2016.08); *A23L 11/10* (2016.08); *A23P 20/20* (2016.08); *A23V 2002/00* (2013.01)

(58) Field of Classification Search
CPC .......... A23L 11/01; A23L 11/03; A23L 11/07; A23L 11/10; A23P 20/20; A23V 2002/00
See application file for complete search history.

(56) References Cited

U.S. PATENT DOCUMENTS 5,417,992 A * 5/1995 Rizvi ..................... A21C 1/003
366/85
7,220,442 B2 * 5/2007 Gautam ..................... A23J 3/08
426/312

(Continued)

FOREIGN PATENT DOCUMENTS

| CN | 1190545 A | 8/1998 |
| CN | 101507444 A | 8/2009 |

(Continued)

*Primary Examiner* — Anthony J Weier
(74) *Attorney, Agent, or Firm* — Mars, Incorporated

(57) ABSTRACT

The present invention, in an embodiment, is a product having an outer shell with at least one first legume and an inner portion with at least one second legume. In an embodiment, the at least one first legume is different from the at least one second legume and the outer shell includes at least a first layer and a second layer where the first layer is different from the second layer. In an embodiment, the product is a ready-to-eat food and the outer shell is crispy.

18 Claims, 1 Drawing Sheet

(56) References Cited

U.S. PATENT DOCUMENTS

| | | | |
|---|---|---|---|
| 7,935,368 B2 | 5/2011 | Yamada | |
| 8,586,120 B2 | 11/2013 | Karwowski et al. | |
| 8,986,774 B2 * | 3/2015 | Ganjyal | A23L 3/40 |
| | | | 426/661 |
| 10,182,591 B2 * | 1/2019 | Morales | A23L 11/07 |
| 2005/0186308 A1 | 8/2005 | Wada | |
| 2006/0110493 A1 * | 5/2006 | Schnieber | A21D 6/001 |
| | | | 426/93 |
| 2007/0087100 A1 * | 4/2007 | Fornaguera | A23G 3/0021 |
| | | | 426/516 |
| 2008/0145483 A1 * | 6/2008 | Berrios | A23P 30/20 |
| | | | 426/72 |
| 2010/0239720 A1 | 9/2010 | Jensen et al. | |

FOREIGN PATENT DOCUMENTS

| | | |
|---|---|---|
| GB | 2105968 B | 7/1985 |
| IN | 200400521 | 5/2006 |
| KR | 20100038929 A | 4/2010 |
| KR | 20120116603 A | 10/2012 |
| WO | 2016004057 A1 | 1/2016 |
| WO | 2016140881 A1 | 9/2016 |

* cited by examiner

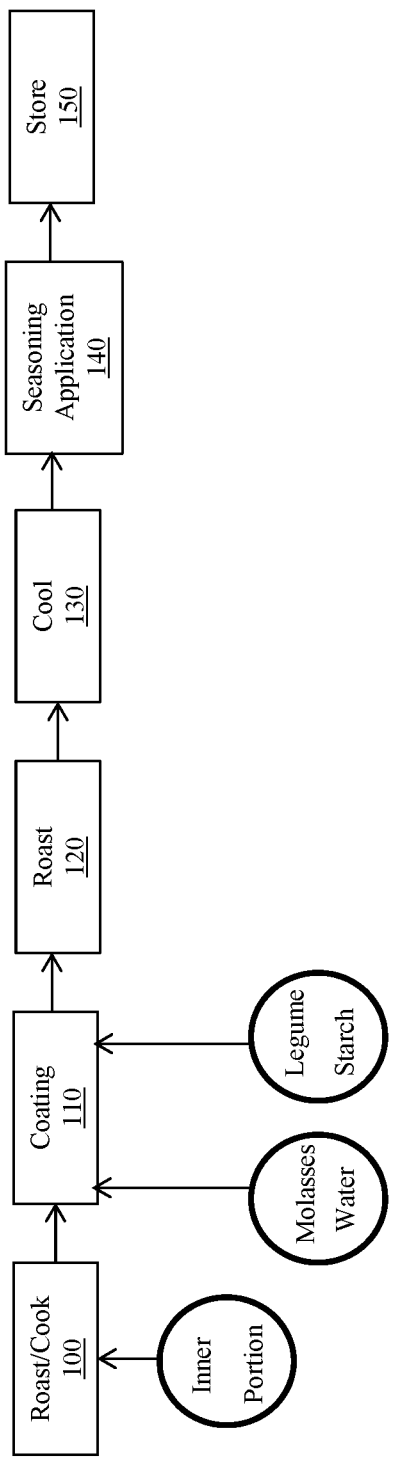

COATED LEGUME-BASED FOOD PRODUCTS

CROSS-REFERENCE TO RELATED APPLICATIONS

This application is a national stage application, filed under 35 U.S.C. § 371, of International Application No. PCT/US2017/013524, filed Jan. 13, 2017, which claims priority to U.S. Provisional App. Ser. No. 62/278,251, filed on Jan. 13, 2016, the entire contents of each hereby being incorporated by reference herein for any and all purposes.

TECHNICAL FIELD

The present invention relates to legume-based food products.

BACKGROUND

In developing countries, malnutrition is partially driven by a diet poor in protein, but more importantly by the poor quality of such protein. Optimal growth and cognitive development of people and specifically children depends on protein quality and key micronutrient (bio)availability.

Peanuts and other legumes are part of the cultural food repertoire of many countries including India. The peanuts and legumes are eaten in a variety of ways. For example, the legumes may be eaten as a topping in poha or dal to a variety of snacks such as chikki (peanut brittle), sev (extruded, then fried chickpeas), coated-then-fried peanuts, to rolled chickpeas.

However, the quality of peanuts in India is questionable given the relatively high levels of aflatoxins in the supply chain. Furthermore, while peanuts are a good source of protein (and fat), they have low levels of lysine and hence, their protein quality is low—probably as low as cereals like rice.

Embodiments of the present invention include a series of nutritional products having legume-based centers where such centers can be legumes such as soybeans, peas, chickpeas, lentils, or the like and/or cream-based lentils where the creams are mainly comprised of legume-based flour and a suitable binding agent such as semi-solid fat.

Embodiments of the present invention may become a relevant vehicle for protein/micronutrient delivery as in some embodiments, the products may resemble in shape and/or taste those which are already commonly used by consumers today, while providing a desirable nutritional profile.

SUMMARY OF INVENTION

In an embodiment, the product comprises an outer shell comprising at least one first legume; and an inner portion comprising at least one second legume; wherein the at least one first legume is different from the at least one second legume; wherein the outer shell comprises at least a first layer and a second layer; wherein the first layer is different from the second layer; wherein the product is a ready-to-eat food; and wherein the outer shell is crispy.

In an embodiment, the at least one first legume is a pulse.

In yet another embodiments, the at least one first legume is selected from the group consisting of chickpea, green pea, yellow pea, black eyed peas, pinto bean, kidney bean, black bean, mung bean, adzuki bean, fava bean, edamame, green lentil, red lentil, black lentil, lupin and combinations thereof.

In the embodiments, the at least one first legume is soya.

In an embodiment, the at least second legume is a pulse.

In other embodiments, the at least one second legume is selected from the group consisting of chick pea, soybean, edamame, green pea, yellow pea, black eyed peas, pinto bean, kidney bean, black bean, mung, adzuki, fava, green lentil, red lentil, black lentil, lupin, and combinations thereof.

In the embodiments, the at least one second legume is soya.

In yet other embodiments, the inner portion is creamy. In the embodiments, the inner portion further comprises at least one binding agent.

In embodiments, the outer shell comprises at least one of molasses, jaggery, water, salt, starch, and baking soda.

In yet other embodiments, the outer shell further comprises at least one first additive selected from the group consisting of iron, vitamins A, B1, B2, B6, B12, C, D, D3, folic acid, thiamine, riboflavin, niacin, and zinc. In embodiments, the inner portion further comprises at least one second additive selected from the group consisting of iron, vitamins A, B1, B2, B6, B12, C, D, D3, folic acid, thiamine, riboflavin, niacin, and zinc.

In some embodiments, the product has a shelf life of at least 12 months.

In embodiments, the product is substantially free of at least one of high fructose corn syrup, dairy-based components, enzymes or gluten.

In another embodiment, the product comprises an outer shell comprising at least one first legume; and an inner portion comprising at least one second legume selected from the group consisting of chick pea, soybean, edamame, green pea, yellow pea, black eyed peas, pinto bean, kidney bean, black bean, mung, adzuki, fava, green lentil, red lentil, black lentil, lupin, and combinations thereof; wherein the at least one first legume is different from the at least one second legume; wherein the outer shell comprises at least a first layer and a second layer; wherein the first layer is different from the second layer; wherein the product is a ready-to-eat food; and wherein the outer shell is crispy.

In the embodiment, the inner portion further comprises a creamy component; wherein the creamy component comprises: i) at least one legume-based flour of the at least one second legume and ii) at least one binding agent. In the embodiment, the at least one binding agent is palm oil. In embodiments, the outer shell further comprises at least one first additive selected from the group consisting of iron, vitamins A, B1, B2, B6, B12, C, D, D3, folic acid, thiamine, riboflavin, niacin, zinc, and combinations thereof. In yet other embodiments, the inner portion further comprises at least one second additive selected from the group consisting of iron, vitamins A, B1, B2, B6, B12, C, D, D3, folic acid, thiamine, riboflavin, niacin, and zinc, and combinations thereof.

BRIEF DESCRIPTION OF THE DRAWINGS

FIG. 1 illustrates features of some embodiments of the present invention.

The present invention will be further explained with reference to the attached drawings, wherein like structures are referred to by like numerals throughout the several views. The drawings shown are not necessarily to scale or aspect ratio, with emphasis instead generally being placed upon illustrating the principles of the present invention. Further, some features may be exaggerated to show details of particular components.

The FIGURES constitute a part of this specification and include illustrative embodiments of the present invention and illustrate various objects and features thereof. Further, the figures are not necessarily to scale, some features may be exaggerated to show details of particular components. In addition, any measurements, specifications and the like shown in the figures are intended to be illustrative, and not restrictive. Therefore, specific structural and functional details disclosed herein are not to be interpreted as limiting, but merely as a representative basis for teaching one skilled in the art to variously employ the present invention.

DETAILED DESCRIPTION

In embodiments, the present disclosure relates to ready-to-eat, shelf stable products having a multi-layered legume-based outer shell and an inner filing of legume-based cream. In embodiments, the legume-based products have a crispy outer shell and a creamy inner portion. In some embodiments, the products remain crispy when exposed to high moisture environments over time. In the embodiments, the products, when consumed, provide a significant amount of high quality protein, fiber and nutrients.

The present invention will be further explained with reference to the attached drawings, wherein like structures are referred to by like numerals throughout the several views. The drawings shown are not necessarily to scale, with emphasis instead generally being placed upon illustrating the principles of the present invention. Further, some features may be exaggerated to show details of particular components.

The FIGURES constitute a part of this specification and include illustrative embodiments of the present invention and illustrate various objects and features thereof. Further, the figures are not necessarily to scale, some features may be exaggerated to show details of particular components. In addition, any measurements, specifications and the like shown in the figures are intended to be illustrative, and not restrictive. Therefore, specific structural and functional details disclosed herein are not to be interpreted as limiting, but merely as a representative basis for teaching one skilled in the art to variously employ the present invention.

Among those benefits and improvements that have been disclosed, other objects and advantages of this invention will become apparent from the following description taken in conjunction with the accompanying FIGURES. Detailed embodiments of the present invention are disclosed herein; however, it is to be understood that the disclosed embodiments are merely illustrative of the invention that may be embodied in various forms. In addition, each of the examples given in connection with the various embodiments of the invention which are intended to be illustrative, and not restrictive.

Throughout the specification and claims, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the term "substantially free" means less than 5%.

As used herein, the term "free" means 0%.

As used herein, the term "organoleptic properties" includes the flavor display, texture, and sound of a food that are experienced by the eater of said food when said food is eaten.

As used herein, the term "single serving" means any quantity of food sold, marketed, described, advertised, or implied to be equivalent to a single serving size or unit. For example, in the U.S., single serving sizes for foods are defined in the FDA Labeling Rules as contained in 21 CFR § 101.12 which is incorporated herein by reference in its entirety.

As used herein, the term "fat" refers to the total amount of digestible, partially digestible and nondigestible fats or oils that are present in the embodiments of the present invention. As used herein, the terms "lipid", "fat" and "oil" are synonymous.

As used herein, the term "carbohydrate" refers to the total amount of sugar alcohols, monosaccharides, disaccharides, oligosaccharides, digestible, partially digestible and non-digestible polysaccharides; and lignin or lignin like materials that are present in the embodiments of the present invention.

As used herein, the term "ready-to-eat" when used to describe a food, means that after manufacture and packaging, the food product requires no additional processing, including but not limited to cooking, baking, microwaving, boiling, frying; or combination with components outside of the product's packaging to achieve the novel combination of balanced nutrition and taste that Applicants are claiming. However, this does not rule out that one or all of the parameters of Applicants' invention, for example, balanced nutrition, convenience and taste, may be improved when said compositions are processed further or combined with other foods.

In embodiments, a product is determined to be "crispy" by texture measurements using an Instron texture analyzer or equivalent. In other embodiments, a product is determined to be "crispy" based on organoleptic properties and/or mouthfeel. In yet other embodiments, a product is determined to be "crispy" based on an acoustic peak count of at least 10 as determined by the Acoustic Crispiness Test Procedure detailed herein. In yet other embodiments, a product is determined to be "crispy" based on a peak fracture force of at least 1,200 grams as determined by the Force Crispiness Test Procedure detailed herein.

As used herein, a product is determined to be "creamy" based on viscosity measurements using a Brookfield viscometer and/or a stress-controlled rheometer equipped with a tribology probe or equivalent. In other embodiments, a product is determined to be creamy based on organoleptic properties and/or mouthfeel.

As used herein, the "shelf life" of a product is determined based on the change in organoleptic properties of a food or drink in barrier packaging over time.

As used herein, the term "seasoning" means salt, herbs and/or spices added to a food product to enhance flavor. In some embodiments, the average particle size of the "seasoning" is reduced to 1 micron to 1000 microns via milling or other size reduction process.

As used herein, the term "legume" means a fruit or seed of leguminous plants.

As used herein, the phrase "legume-based flour" means a powder formed from milling one or more legumes.

As used herein, the term "grain" means edible seeds of grasses. The term "grain" and "cereal" are used interchangeably herein. Non-limiting examples of grains include rice, teff, sorghum, corn, millet, wheat, *quinoa*, and farro.

As used herein, the phrase "grain-based flour" means a powder formed from milling grains.

As used herein, the term "pulse" means the dried seed of a legume.

As used herein, the phrase "water content" or "moisture content" of a product means the weight percent of water in the product, on a wet basis.

All percentages and ratios are calculated by weight unless otherwise indicated. All percentages and ratios are calculated based on the total composition unless otherwise indicated.

Unless otherwise noted, all component or composition levels are in reference to the active level of that component or composition, and are exclusive of impurities, for example, residual by-products, which may be present in commercially available sources.

Products

In embodiments, the present disclosure relates to ready-to-eat, shelf stable products having a multi-layered legume-based outer shell and an inner portion of legume-based cream. In embodiments, the legume-based products have a crispy outer shell and a creamy inner portion.

In an embodiment, the product comprises an outer shell comprising at least one first legume; and an inner portion comprising at least one second legume; wherein the at least one first legume is different from the at least one second legume; wherein the outer shell comprises at least a first layer and a second layer; wherein the first layer is different from the second layer; wherein the product is a ready-to-eat food; and wherein the outer shell is crispy.

In an embodiment, the at least one first legume is a pulse.

In yet another embodiments, the at least one first legume is selected from the group consisting of chickpea, green pea, yellow pea, black eyed peas, pinto bean, kidney bean, black bean, mung bean, adzuki bean, fava bean, edamame, green lentil, red lentil, black lentil, lupin and combinations thereof.

In the embodiments, the at least one first legume is soya.

In an embodiment, the at least second legume is a pulse.

In other embodiments, the at least one second legume is selected from the group consisting of chick pea, soybean, edamame, green pea, yellow pea, black eyed peas, pinto bean, kidney bean, black bean, mung, adzuki, fava, green lentil, red lentil, black lentil, lupin, and combinations thereof.

In the embodiments, the at least one second legume is soya.

In yet other embodiments, the inner portion is creamy. In the embodiments, the inner portion further comprises at least one binding agent.

In embodiments, the outer shell comprises at least one of molasses, jaggery, water, salt, starch, and baking soda.

In yet other embodiments, the outer shell further comprises at least one first additive selected from the group consisting of iron, vitamins A, B1, B2, B6, B12, C, D, D3, folic acid, thiamine, riboflavin, niacin, and zinc. In embodiments, the inner portion further comprises at least one second additive selected from the group consisting of iron, vitamins A, B1, B2, B6, B12, C, D, D3, folic acid, thiamine, riboflavin, niacin, and zinc.

In some embodiments, the product has a shelf life of at least 12 months.

In some embodiments, the product is substantially free of at least one of high fructose corn syrup, dairy-based components, enzymes or gluten.

In some embodiments, the outer shell is substantially free of grain-based flour. In other embodiments, the inner portion is substantially free of grain-based flour. In yet other embodiments, the product is free of high fructose corn syrup. In embodiments, the product is free of emulsifiers. In some embodiments, the product is free of enzymes.

In another embodiment, the product comprises an outer shell comprising at least one first legume; and an inner portion comprising at least one second legume selected from the group consisting of chick pea, soybean, edamame, green pea, yellow pea, black eyed peas, pinto bean, kidney bean, black bean, mung, adzuki, fava, green lentil, red lentil, black lentil, lupin, and combinations thereof; wherein the at least one first legume is different from the at least one second legume; wherein the outer shell comprises at least a first layer and a second layer; wherein the first layer is different from the second layer; wherein the product is a ready-to-eat food; and wherein the outer shell is crispy.

In the embodiment, the inner portion further comprises a creamy component; wherein the creamy component comprises: i) at least one legume-based flour of the at least one second legume and ii) at least one binding agent. In the embodiment, the at least one binding agent is palm oil. In embodiments, the outer shell further comprises at least one first additive selected from the group consisting of iron, vitamins A, B1, B2, B6, B12, C, D, D3, folic acid, thiamine, riboflavin, niacin, zinc, and combinations thereof. In yet other embodiments, the inner portion further comprises at least one second additive selected from the group consisting of iron, vitamins A, B1, B2, B6, B12, C, D, D3, folic acid, thiamine, riboflavin, niacin, and zinc, and combinations thereof.

In some embodiments, the inner portion can include different legumes. In some embodiments, the inner portion can include legumes such as soybeans, peas, chickpeas, and lentils. In some embodiments, the inner portion may include a creamy component comprising a mixture of legume-based flour and various binding agents such as a semi-solid fat. In yet other embodiments, the inner portion may include a combination of legumes and a creamy component. In yet other embodiments, the inner portion may include a combination of legumes and a creamy component. In some embodiments, the binding agent is palm oil.

In embodiments, the product may further include at least one additive included in the outer shell and/or the inner portion. In the embodiments, the additive includes, but is not limited to, at least one vitamin or mineral. In other embodiments, the additive may include, but is not limited to, iron, vitamins A, B1, B2, B6, B12, C, D, D3, folic acid, thiamine, riboflavin, niacin, and zinc. In embodiments, the inner portion includes at least one additive selected from Vitamins A, D3, B1, B2, B12, C and folic acid. In the embodiments, the outer shell includes at least one additive selected from the Vitamin B6, niacin, iron and zinc. Table 1 shows a non-limiting example of the additives and associated amounts included in 40 grams of the product:

TABLE 1

| Additive | Amount per 40 gram serving |
| --- | --- |
| Iron (NaFeEDTA) | 5-10 mg |
| B12 | 1-2 μg |
| Vit C | 40-80 mg |
| Vit A | 150-400 RAE |
| Folate | 45-90 μg |
| Vit D | 60-260 IU |
| Thiamin | 0.4-0.8 mg |
| Riboflavin | 0.5-1 mg |
| Niacin | 4-8 mg |
| Vitamin B6 | 0.5-1 mg |
| Zinc (as sulphate) | 4-8 mg |

In some embodiments, the outer shell and/or the inner portion includes one or more natural, natural-identical or artificial dye. In some embodiments, the outer shell comprises a natural colorant including but not limited to beetroot powder, paprika, and/or green pea flour. In some embodiments, the outer shell and/or the inner portion includes one or more natural, natural-identical or artificial flavorings.

In embodiments, the outer shell is substantially free of grain-based flour. In embodiments, the inner portion is substantially free of grain-based flour. In embodiments, the outer shell is free of grain-based flour. In embodiments, the inner portion is free of grain-based flour.

In yet other embodiments, the outer shell and/or the inner portion includes at least one grain-based flour. In the embodiments, the grain-based flour may include, but is not limited to, rice, teff, sorghum, corn, millet, wheat, quinoa, and/or farro. In some embodiments, the grain-based flour is added to reduce the density of the products In another embodiment, the outer shell and/or the inner portion is substantially free of high fructose corn syrup. In yet other embodiments, the outer shell and/or inner portion is substantially free of emulsifiers. In another embodiment, the outer shell and/or inner portion is substantially free of enzymes. In other embodiment, the outer shell and/or inner portion is substantially free of gluten. In yet other embodiments, the outer shell and/or inner portion is substantially free of high fructose corn syrup, emulsifiers, enzymes, and gluten.

In yet other embodiments, the outer shell and/or the inner portion is substantially free of chocolate, chocolate-containing ingredients, cocoa, cocoa powder, cocoa cake, chocolate liquor, or mixtures thereof. In another embodiment, the outer shell and/or inner portion is substantially free of cocoa butter. In yet other embodiments, the outer shell and/or inner portion is substantially free of chocolate, chocolate-containing ingredients, cocoa, cocoa powder, cocoa cake, chocolate liquor, and cocoa butter.

In another embodiment, the outer shell and/or the inner portion is free of high fructose corn syrup. In yet other embodiments, the outer shell and/or inner portion is free of emulsifiers. In another embodiment, the outer shell and/or inner portion is free of enzymes. In other embodiment, the outer shell and/or inner portion is free of gluten. In yet other embodiments, the outer shell and/or inner portion is free of high fructose corn syrup, emulsifiers, enzymes, and gluten.

In yet other embodiments, the outer shell and/or the inner portion is free of chocolate, chocolate-containing ingredients, cocoa, cocoa powder, cocoa cake, chocolate liquor, cocoa butter or mixtures thereof. In another embodiment, the outer shell and/or inner portion is free of cocoa butter. In yet other embodiments, the outer shell and/or inner portion is free of chocolate, chocolate-containing ingredients, cocoa, cocoa powder, cocoa cake, chocolate liquor, and cocoa butter.

In an embodiment, the outer shell coats a 100% of the inner portion. In other embodiments, the outer shell coats less than 100% of the inner portion.

In some embodiments, the outer shell comprises at least a first layer and a second layer. In some embodiments, the outer shell comprises at least two layers. In some embodiments, the outer shell comprises at least three layers. In some embodiments, the outer shell comprises at least four layers. In some embodiments, the outer shell comprises at least five layers. In some embodiments, the outer shell comprises at least six layers. In some embodiments, the outer shell comprises at least seven layers. In some embodiments, the outer shell comprises at least eight layers.

In other embodiments, the at least first layer comprises molasses, jaggery or the like, water, and/or salt. In the embodiments, the second layer comprises legume-based flour, starch and baking soda. In embodiments, the starch is an ultracrisp starch. In other embodiments, the outer shell is comprised of multiple layers, wherein the one layer comprises molasses, jaggery or the like, water, and/or salt and the adjacent layer comprises legume-based flour, starch and baking soda.

In another embodiment, the product further includes an oil layer and wherein the oil layer coats at least a portion of the outer shell. In embodiments, the oil layer coats the entire outer shell. In some embodiments, the oil layer coats less than 50% of the surface area of the outer shell. In other embodiments, the oil layer comprises a vegetable oil. In some embodiments, the vegetable oil is sunflower oil, palm oil, peanut oil, canola oil, or mixtures thereof.

In some embodiments, the product is at least partially coated with seasoning. In embodiments, the seasoning may include spices such as masala, Andhra, red chutney, green chili, tomato, sweet curry, chili lime, sour cream, onion, paprika, and mixtures thereof. In yet other embodiments, the seasoning is selected based, at least in part, on the cultural tastes of the consumer where the product is being consumed.

In embodiments, the seasoning is mixed with the oil and coats at least a portion of the outer shell. In some embodiments, the seasoning mixed with the oil coats less than 50% of the surface area of the outer shell. In embodiments, the oil and/or seasoning coating layer is substantially evenly distributed on outer shell.

In yet other embodiments, the seasoning is mixed with the inner portion.

In some embodiments, the outer shell is 40 weight percent to 80 weight percent of the product. In yet other embodiments, the outer shell is 40 weight percent to 70 weight percent of the product. In yet other embodiments, the outer shell is 40 weight percent to 60 weight percent of the product. In yet other embodiments, the outer shell is 40 weight percent to 50 weight percent of the product. In yet other embodiments, the outer shell is 50 weight percent to 80 weight percent of the product. In yet other embodiments, the outer shell is 60 weight percent to 80 weight percent of the product. In yet other embodiments, the outer shell is 70 weight percent to 80 weight percent of the product. In yet other embodiments, the outer shell is 50 weight percent to 70 weight percent of the product.

In yet other embodiments, the inner portion is 20 weight percent to 60 weight percent of the product. In yet other embodiments, the inner portion is 20 weight percent to 50 weight percent of the product. In yet other embodiments, the inner portion is 20 weight percent to 40 weight percent of the product. In yet other embodiments, the inner portion is 20 weight percent to 30 weight percent of the product. In yet other embodiments, the inner portion is 30 weight percent to 60 weight percent of the product. In yet other embodiments, the inner portion is 40 weight percent to 60 weight percent of the product. In yet other embodiments, the inner portion is 50 weight percent to 60 weight percent of the product. In yet other embodiments, the inner portion is 30 weight percent to 50 weight percent of the product.

In some embodiments, the oil layer is 1 weight percent to 15 weight percent of the product. In some embodiments, the oil layer is 1 weight percent to 10 weight percent of the product. In some embodiments, the oil layer is 1 weight percent to 8 weight percent of the product. In some embodiments, the oil layer is 1 weight percent to 7 weight percent of the product. In some embodiments, the oil layer is 1 weight percent to 5 weight percent of the product. In some embodiments, the oil layer is 1 weight percent to 3 weight percent of the product. In some embodiments, the oil layer is 3 weight percent to 15 weight percent of the product. In some embodiments, the oil layer is 5 weight percent to 15 weight percent of the product. In some embodiments, the oil layer is 7 weight percent to 15 weight percent of the product. In some embodiments, the oil layer is 8 weight percent to 15 weight percent of the product. In some embodiments, the oil layer is 10 weight percent to 15 weight percent of the product. In some embodiments, the oil layer is 2 weight percent to 8 weight percent of the product. In some embodiments, the oil layer is 5 weight percent to 10 weight percent of the product. In some embodiments, the oil layer is 3 weight percent to 5 weight percent of the product.

In some embodiments, the seasoning is 1 weight percent to 15 weight percent of the product. In some embodiments, the seasoning is 1 weight percent to 12 weight percent of the product. In some embodiments, the seasoning is 1 weight percent to 10 weight percent of the product. In some embodiments, the seasoning is 1 weight percent to 8 weight percent of the product. In some embodiments, the seasoning is 1 weight percent to 7 weight percent of the product. In some embodiments, the seasoning is 1 weight percent to 5 weight percent of the product. In some embodiments, the seasoning is 1 weight percent to 3 weight percent of the product. In some embodiments, the seasoning is 3 weight percent to 15 weight percent of the product. In some embodiments, the seasoning is 5 weight percent to 15 weight percent of the product. In some embodiments, the seasoning is 7 weight percent to 15 weight percent of the product. In some embodiments, the seasoning is 8 weight percent to 15 weight percent of the product. In some embodiments, the seasoning is 10 weight percent to 15 weight percent of the product. In some embodiments, the seasoning is 12 weight percent to 15 weight percent of the product. In some embodiments, the seasoning is 2 weight percent to 8 weight percent of the product. In some embodiments, the seasoning is 5 weight percent to 10 weight percent of the product. In some embodiments, the seasoning is 3 weight percent to 5 weight percent of the product.

In embodiments, the product includes 40 weight percent to 50 weight percent outer shell, 40 weight percent to 50 weight percent inner portion, 5 weight percent to 10 weight percent seasoning and 5 weight percent to 10 weight percent oil, wherein the seasoning and the oil form a coating on the outer shell of the product. In embodiments, the product includes 40 weight percent to 45 weight percent outer shell, 40 weight percent to 45 weight percent inner portion, 5 weight percent to 8 weight percent seasoning and 5 weight percent to 8 weight percent oil, wherein the seasoning and the oil form a coating on the outer shell of the product. In embodiments, the product includes 43 weight percent to 45 weight percent outer shell, 43 weight percent to 45 weight percent inner portion, 6 weight percent to 7 weight percent seasoning and 6 weight percent to 7 weight percent oil, wherein the seasoning and the oil form a coating on the outer shell of the product.

In yet other embodiments, the outer shell includes at least one legume-based flour, molasses or the like, cornstarch, oil, and seasoning. In embodiments, the outer shell includes 60% to 95% legume-based flour. In embodiments, the outer shell includes 60% to 90% legume-based flour. In embodiments, the outer shell includes 60% to 85% legume-based flour. In embodiments, the outer shell includes 60% to 80% legume-based flour. In embodiments, the outer shell includes 60% to 75% legume-based flour. In embodiments, the outer shell includes 60% to 70% legume-based flour. In other embodiments, the outer shell includes 75% to 95% legume-based flour. In embodiments, the outer shell includes 80% to 95% legume-based flour. In embodiments, the outer shell includes 85% to 95% legume-based flour. In embodiments, the outer shell includes 90% to 95% legume-based flour. In embodiments, the outer shell includes 80% to 90% legume-based flour.

In some embodiments, the outer shell includes 1% to 8% molasses, jaggery or the like. In some embodiments, the outer shell includes 2% to 8% molasses, jaggery or the like. In some embodiments, the outer shell includes 3% to 8% molasses, jaggery or the like. In some embodiments, the outer shell includes 5% to 8% molasses, jaggery or the like. In some embodiments, the outer shell includes 7% to 8% molasses, jaggery or the like. In some embodiments, the outer shell includes 1% to 7% molasses, jaggery or the like. In some embodiments, the outer shell includes 1% to 6% molasses, jaggery or the like. In some embodiments, the outer shell includes 1% to 5% molasses, jaggery or the like. In some embodiments, the outer shell includes 1% to 4% molasses, jaggery or the like. In some embodiments, the outer shell includes 1% to 3% molasses, jaggery or the like. In some embodiments, the outer shell includes 1% to 2% molasses, jaggery or the like. In some embodiments, the outer shell includes 3% to 5% molasses, jaggery or the like.

In some embodiments, the outer shell includes 1% to 4% cornstarch. In some embodiments, the outer shell includes 1% to 3% cornstarch. In some embodiments, the outer shell includes 1% to 2% cornstarch. In some embodiments, the outer shell includes 1% to 4% cornstarch. In some embodiments, the outer shell includes 2% to 4% cornstarch. In some embodiments, the outer shell includes 2% to 4% cornstarch. In some embodiments, the outer shell includes 2% to 3% cornstarch.

In some embodiments, the product further includes at least one cereal detailed herein. In the embodiments, the at least one cereal is 1 weight percent to 25 weight percent of the product. In the embodiments, the at least one cereal is 3 weight percent to 25 weight percent of the product. In the embodiments, the at least one cereal is 8 weight percent to 25 weight percent of the product. In the embodiments, the at least one cereal is 10 weight percent to 25 weight percent of the product. In the embodiments, the at least one cereal is 15 weight percent to 25 weight percent of the product. In the embodiments, the at least one cereal is 20 weight percent to 25 weight percent of the product. In the embodiments, the at least one cereal is 1 weight percent to 20 weight percent of the product. In the embodiments, the at least one cereal is 1 weight percent to 15 weight percent of the product. In the embodiments, the at least one cereal is 1 weight percent to 10 weight percent of the product. In the embodiments, the at least one cereal is 1 weight percent to 8 weight percent of the product. In the embodiments, the at least one cereal is 1 weight percent to 3 weight percent of the product. In the embodiments, the at least one cereal is 3 weight percent to 20 weight percent of the product. In the embodiments, the at least one cereal is 8 weight percent to 15 weight percent of the product. In the embodiments, the at least one cereal is 10 weight percent to 15 weight percent of the product. In the embodiments, the at least one cereal is 10 weight percent of the product. In the embodiments, the at least one cereal is 15 weight percent of the product. In yet other embodiments, the product is substantially free of cereal. In yet other embodiments, the product is free of cereal.

In embodiments, when the product, as described in one or more embodiments herein, is tested by exposing the product to a sufficient temperature and a sufficient relative humidity to result in the product having a moisture content of 5 weight percent, the product is crispy. In embodiments, when the product, as described in one or more embodiments herein, is tested by exposing the product to a sufficient temperature and a sufficient relative humidity to result in the product having a moisture content of 4.5 weight percent, the product is crispy. In embodiments, when the product, as described in one or more embodiments herein, is tested by exposing the product to a sufficient temperature and a sufficient relative humidity to result in the product having a moisture content of 5.5 weight percent, the product is crispy. In embodiments, when the product, as described in one or more embodiments herein, is tested by exposing the product to a sufficient temperature and a sufficient relative humidity to result in the product having a moisture content of 4 weight percent, the product is crispy. In embodiments, when the product, as described in one or more embodiments herein, is tested by exposing the product to a sufficient temperature and a sufficient relative humidity to result in the product having a moisture content of 3.5 weight percent, the product is crispy. In embodiments, when the product, as described in one or more embodiments herein, is tested by exposing the product to a sufficient temperature and a sufficient relative humidity to result in the product having a moisture content of 3 weight percent, the product is crispy. In embodiments, when the product, as described in one or more embodiments herein, is tested by exposing the product to a sufficient temperature and a sufficient relative humidity to result in the product having a moisture content of 2.5 weight percent, the product is crispy.

In some embodiments, the product includes an outer shell that is crispy, an inner portion that is creamy and a water content of the outer shell of the product is at least 20% greater than a water content of the inner portion. In some embodiments, the product includes an outer shell that is crispy, an inner portion that is creamy and a water content of the outer shell of the product is at least 25% greater than a water content of the inner portion. In some embodiments, the product includes an outer shell that is crispy, an inner portion that is creamy and a water content of the outer shell of the product is at least 30% greater than a water content of the inner portion. In some embodiments, the product includes an outer shell that is crispy, an inner portion that is creamy and a water content of the outer shell of the product is at least 35% greater than a water content of the inner portion. In some embodiments, the product includes an outer shell that is crispy, an inner portion that is creamy and a water content of the outer shell of the product is at least 40% greater than a water content of the inner portion. In some embodiments, the product includes an outer shell that is crispy, an inner portion that is creamy and a water content of the outer shell of the product is at least 45% greater than a water content of the inner portion. In some embodiments, the product includes an outer shell that is crispy, an inner portion that is creamy and a water content of the outer shell of the product is at least 50% greater than a water content of the inner portion. In some embodiments, the product includes an outer shell that is crispy, an inner portion that is creamy and a water content of the outer shell of the product is at least 55% greater than a water content of the inner portion. In some embodiments, the product includes an outer shell that is crispy, an inner portion that is creamy and a water content of the outer shell of the product is at least 60% greater than a water content of the inner portion. In some embodiments, the product includes an outer shell that is crispy, an inner portion that is creamy and a water content of the outer shell of the product is at least 65% greater than a water content of the inner portion. In some embodiments, the product includes an outer shell that is crispy, an inner portion that is creamy and a water content of the outer shell of the product is at least 70% greater than a water content of the inner portion. In some embodiments, the product includes an outer shell that is crispy, an inner portion that is creamy and a water content of the outer shell of the product is at least 80% greater than a water content of the inner portion. In some embodiments, the product includes an outer shell that is crispy, an inner portion that is creamy and a water content of the outer shell of the product is at least 90% greater than a water content of the inner portion. In some embodiments, the product includes an outer shell that is crispy, an inner portion that is creamy and a water content of the outer shell of the product is at least 100% greater than a water content of the inner portion.

In some embodiments, the legume-based flour of the outer shell is selected from the group consisting of legume-based flour of chickpea, green pea, yellow pea, black eyed peas, pinto bean, kidney bean, black bean, mung bean, adzuki bean, fava bean, green lentil, red lentil, black lentil, lupin and combinations thereof. In some embodiments, the legume-based flour of the outer shell is a legume-based flour of chick pea, yellow pea, fava bean, or mixtures thereof. In some embodiments, the legume-based flour of the outer shell is a legume-based flour of peanut.

In some embodiments, the inner portion will comprise a legume. In some embodiments, the legume is selected from the group consisting of chickpea, green pea, yellow pea, black eyed peas, pinto bean, kidney bean, black bean, mung bean, adzuki bean, fava bean, green lentil, red lentil, black lentil, lupin and combinations thereof. In other embodiments, the legume is selected from the group consisting of chick pea, soybean, edamame, green pea, yellow pea, black eyed peas, pinto bean, kidney bean, black bean, mung, adzuki, fava, green lentil, red lentil, black lentil, lupin and combinations thereof. In other embodiments, the legume is a pulse.

In some embodiments, the legume is selected from the group consisting of chickpea, green pea, yellow pea, black eyed peas, pinto bean, kidney bean, black bean, mung bean, adzuki bean, fava bean, edamame, green lentil, red lentil, black lentil, lupin and combinations thereof. In some embodiments, the legume is selected from the group consisting of peanuts, soybeans, peas, chickpeas, edamame, and lentils.

In some embodiments, the inner portion includes a creamy component. In embodiments, the creamy component includes: i) at least one legume-based flour of chickpea, green pea, yellow pea, black eyed peas, pinto bean, kidney bean, black bean, mung bean, adzuki bean, fava bean, edamame, green lentil, red lentil, black lentil, lupin and combinations thereof, and ii) at least one binding agent. In some embodiments, the at least one legume-based flour is chick pea flour or lentil flour. In embodiments, the at least one binding agent is a semi-solid fat. In embodiments, the binding agent is at least one of sunflower oil, palm oil, peanut oil, canola oil, or mixtures thereof. In embodiments, the binding agent is palm oil.

In some embodiments, the inner portion includes a legume as detailed herein and/or a creamy component as detailed herein.

In some embodiments, the shape of the product may be triangular, rectangular, square or rhomboid. In some embodiments, the seasoning is visible in the outer shell. In other embodiments, the seasoning is not visible in the outer shell.

In an embodiment, the product has a bulk density of the product of 0.1 kg/liter to 2 kg/liter. In another embodiment, the product has a bulk density of the product of 0.1 kg/liter to 1.7 kg/liter. In yet another embodiment, the product has a bulk density of the product of 0.1 kg/liter to 1.3 kg/liter. In other embodiments, the product has a bulk density of the product of 0.1 kg/liter to 1.1 kg/liter. In another embodiment, the product has a bulk density of the product of 0.1 kg/liter to 0.9 kg/liter. In an embodiment, the product has a bulk density of the product of 0.1 kg/liter to 0.7 kg/liter. In another embodiment, the product has a bulk density of the product of 0.1 kg/liter to 0.5 kg/liter.

In an embodiment, the product has a bulk density of the product of 0.1 kg/liter to 2 kg/liter. In another embodiment, the product has a bulk density of the product of 0.3 kg/liter to 2 kg/liter. In yet another embodiment, the product has a bulk density of the product of 0.5 kg/liter to 2 kg/liter. In other embodiments, the product has a bulk density of the product of 0.7 kg/liter to 2 kg/liter. In another embodiment, the product has a bulk density of the product of 0.9 kg/liter to 2 kg/liter. In an embodiment, the product has a bulk density of the product of 1.1 kg/liter to 2 kg/liter. In another embodiment, the product has a bulk density of the product of 1.5 kg/liter to 2 kg/liter.

In another embodiment, the product has a bulk density of the product of 0.3 kg/liter to 1.5 kg/liter. In another embodiment, the product has a bulk density of the product of 0.5 kg/liter to 1.0 kg/liter. In another embodiment, the product has a bulk density of the product of 0.5 kg/liter. In another embodiment, the product has a bulk density of the product of 1.0 kg/liter.

In some embodiments, a weight of the product is 0.5 grams to 5 grams. In some embodiments, a weight of the product is 0.5 grams to 4 grams. In some embodiments, a weight of the product is 0.5 grams to 3 grams. In some embodiments, a weight of the product is 0.5 grams to 2 grams. In some embodiments, a weight of the product is 0.5 grams to 1 gram. In some embodiments, a weight of the product is 1 gram to 5 grams. In some embodiments, a weight of the product is 2 grams to 5 grams. In some embodiments, a weight of the product is 3 grams to 5 grams. In some embodiments, a weight of the product is 1 gram to 4 grams.

In embodiments, the size of a single serving of the product depends, at least in part, on the processing parameters and equipment such as die sizes, etc. In some embodiments, the size of the product ranges from 5×5×1 millimeters to 40×40×20 millimeters (length×width×height). In other embodiments, the size of the product ranges from 10×10×5 millimeters to 40×40×20 millimeters. In some embodiments, the size of the product ranges from 20×20×10 millimeters to 40×40×20 millimeters). In yet other embodiments, the size of the product ranges from 5×5×1 millimeters to 30×30×15 millimeters. In embodiments, the size of the product ranges from 5×5×1 millimeters to 20×20×10 millimeters. In yet other embodiments, the size of the product ranges from 10×10×5 millimeters to 20×20×10 millimeters. In yet other embodiments, the size of the product ranges from 20×15×10 millimeters to 20×20×10 millimeters.

In embodiments, the product has a shelf-life of at least 3 months. In other embodiments, the product has a shelf-life of at least 4 months. In other embodiments, the product has a shelf-life of at least 5 months. In other embodiments, the product has a shelf-life of at least 6 months. In other embodiments, the product has a shelf-life of at least 7 months. In other embodiments, the product has a shelf-life of at least 8 months. In other embodiments, the product has a shelf-life of at least 9 months. In other embodiments, the product has a shelf-life of at least 10 months. In other embodiments, the product has a shelf-life of at least 11 months. In other embodiments, the product has a shelf-life of at least 12 months. In other embodiments, the product has a shelf-life of greater than 12 months.

In some embodiments, the product is a ready-to-eat food. In other embodiments, the inner portion is a ready-to-eat food. In yet other embodiments, the outer shell is a ready-to-eat food.

In some embodiments, the product has a caloric density of 1 to 9 calories per gram of the product. In some embodiments, the product has a caloric density of 2 to 9 calories per gram of the product. In some embodiments, the product has a caloric density of 3 to 9 calories per gram of the product. In some embodiments, the product has a caloric density of 4 to 9 calories per gram of the product. In some embodiments, the product has a caloric density of 5 to 9 calories per gram of the product. In some embodiments, the product has a caloric density of 6 to 9 calories per gram of the product. In some embodiments, the product has a caloric density of 7 to 9 calories per gram of the product. In some embodiments, the product has a caloric density of 8 to 9 calories per gram of the product. In some embodiments, the product has a caloric density of 9 to 9 calories per gram of the product.

In some embodiments, the product has a caloric density of 1 to 9 calories per gram of the product. In some embodiments, the product has a caloric density of 1 to 8 calories per gram of the product. In some embodiments, the product has a caloric density of 1 to 7 calories per gram of the product. In some embodiments, the product has a caloric density of 1 to 6 calories per gram of the product. In some embodiments, the product has a caloric density of 1 to 5 calories per gram of the product. In some embodiments, the product has a caloric density of 1 to 4 calories per gram of the product. In some embodiments, the product has a caloric density of 1 to 3 calories per gram of the product. In some embodiments, the product has a caloric density of 1 to 2 calories per gram of the product.

In some embodiments, the product has a caloric density of 2 to 9 calories per gram of the product. In some embodiments, the product has a caloric density of 3 to 8 calories per gram of the product. In some embodiments, the product has a caloric density of 4 to 7 calories per gram of the product. In some embodiments, the product has a caloric density of 5 to 6 calories per gram of the product.

In some embodiments, the product has a protein-energy ratio of 10% to 50%. In some embodiments, the product has a protein-energy ratio of 10% to 40%. In some embodiments, the product has a protein-energy ratio of 10% to 30%. In some embodiments, the product has a protein-energy ratio of 10% to 25%. In some embodiments, the product has a protein-energy ratio of 10% to 20%. In some embodiments, the product has a protein-energy ratio of 10% to 15%. In some embodiments, the product has a protein-energy ratio of 15% to 50%. In some embodiments, the product has a protein-energy ratio of 20% to 50%. In some embodiments, the product has a protein-energy ratio of 25% to 50%. In some embodiments, the product has a protein-energy ratio of 30% to 50%. In some embodiments, the product has a protein-energy ratio of 35% to 50%. In some embodiments, the product has a protein-energy ratio of 40% to 50%.

In some embodiments, the product has a protein-energy ratio of 15% to 40%. In some embodiments, the product has a protein-energy ratio of 20% to 35%. In some embodiments, the product has a protein-energy ratio of 25% to 30%.

In some embodiments, the product has a fat-energy ratio of 0% to 20%. In some embodiments, the product has a fat-energy ratio of 5% to 20%. In some embodiments, the product has a fat-energy ratio of 10% to 20%. In some embodiments, the product has a fat-energy ratio of 15% to 20%. In some embodiments, the product has a fat-energy ratio of 0% to 15%. In some embodiments, the product has a fat-energy ratio of 0% to 10%. In some embodiments, the product has a fat-energy ratio of 0% to 5%.

In some embodiments, the product has a fat-energy ratio of 20% to 60%. In some embodiments, the product has a fat-energy ratio of 20% to 50%. In some embodiments, the product has a fat-energy ratio of 20% to 45%. In some embodiments, the product has a fat-energy ratio of 20% to 40%. In some embodiments, the product has a fat-energy ratio of 20% to 35%. In some embodiments, the product has a fat-energy ratio of 20% to 30%. In some embodiments, the product has a fat-energy ratio of 20% to 25%.

In some embodiments, the product has a fat-energy ratio of 25% to 60%. In some embodiments, the product has a fat-energy ratio of 30% to 60%. In some embodiments, the product has a fat-energy ratio of 35% to 60%. In some embodiments, the product has a fat-energy ratio of 40% to 60%. In some embodiments, the product has a fat-energy ratio of 45% to 60%. In some embodiments, the product has a fat-energy ratio of 50% to 60%.

In some embodiments, the product has a fat-energy ratio of 30% to 50%. In some embodiments, the product has a fat-energy ratio of 25% to 45%. In some embodiments, the product has a fat-energy ratio of 30% to 35%.

In some embodiments, the calorie content of the product ranges from 200 calories to 700 calories per 100 grams of the product. In some embodiments, the calorie content of the product ranges from 300 calories to 700 calories per 100 grams of the product. In some embodiments, the calorie content of the product ranges from 400 calories to 700 calories per 100 grams of the product. In some embodiments, the calorie content of the product ranges from 500 calories to 700 calories per 100 grams of the product. In some embodiments, the calorie content of the product ranges from 600 calories to 700 calories per 100 grams of the product.

In some embodiments, the calorie content of the product ranges from 200 calories to 600 calories per 100 grams of the product. In some embodiments, the calorie content of the product ranges from 200 calories to 500 calories per 100 grams of the product. In some embodiments, the calorie content of the product ranges from 200 calories to 400 calories per 100 grams of the product.

In some embodiments, the calorie content of the product ranges from 300 calories to 600 calories per 100 grams of the product. In some embodiments, the calorie content of the product ranges from 400 calories to 500 calories per 100 grams of the product.

In some embodiments, the protein content of the product ranges from 5 grams to 40 grams per 100 grams of the product. In some embodiments, the protein content of the product ranges from 5 grams to 35 grams per 100 grams of the product. In some embodiments, the protein content of the product ranges from 5 grams to 30 grams per 100 grams of the product. In some embodiments, the protein content of the product ranges from 5 grams to 25 grams per 100 grams of the product. In some embodiments, the protein content of the product ranges from 5 grams to 20 grams per 100 grams of the product. In some embodiments, the protein content of the product ranges from 5 grams to 15 grams per 100 grams of the product. In some embodiments, the protein content of the product ranges from 5 grams to 10 grams per 100 grams of the product.

In some embodiments, the protein content of the product ranges from 10 grams to 40 grams per 100 grams of the product. In some embodiments, the protein content of the product ranges from 15 grams to 40 grams per 100 grams of the product. In some embodiments, the protein content of the product ranges from 20 grams to 40 grams per 100 grams of the product. In some embodiments, the protein content of the product ranges from 25 grams to 40 grams per 100 grams of the product. In some embodiments, the protein content of the product ranges from 30 grams to 40 grams per 100 grams of the product. In some embodiments, the protein content of the product ranges from 35 grams to 45 grams per 100 grams of the product.

In some embodiments, the product is substantially free of fat. In yet other embodiments, the product is free of fat.

In some embodiments, the fat content of the product ranges from 1 grams to 10 grams per 100 grams of the product. In some embodiments, the fat content of the product ranges from 1 grams to 8 grams per 100 grams of the product. In some embodiments, the fat content of the product ranges from 1 grams to 40 grams per 6 grams of the product. In some embodiments, the fat content of the product ranges from 1 grams to 4 grams per 100 grams of the product. In some embodiments, the fat content of the product ranges from 1 grams to 2 grams per 100 grams of the product. In some embodiments, the fat content of the product ranges from 2 grams to 10 grams per 100 grams of the product. In some embodiments, the fat content of the product ranges from 4 grams to 10 grams per 100 grams of the product. In some embodiments, the fat content of the product ranges from 6 grams to 10 grams per 100 grams of the product. In some embodiments, the fat content of the product ranges from 8 grams to 10 grams per 100 grams of the product.

In some embodiments, the fat content of the product ranges from 10 grams to 40 grams per 100 grams of the product. In some embodiments, the fat content of the product ranges from 10 grams to 35 grams per 100 grams of the product. In some embodiments, the fat content of the product ranges from 10 grams to 30 grams per 100 grams of the product. In some embodiments, the fat content of the product ranges from 10 grams to 25 grams per 100 grams of the product. In some embodiments, the fat content of the product ranges from 10 grams to 20 grams per 100 grams of the product. In some embodiments, the fat content of the product ranges from 10 grams to 15 grams per 100 grams of the product.

In some embodiments, the fat content of the product ranges from 15 grams to 40 grams per 100 grams of the product. In some embodiments, the fat content of the product ranges from 20 grams to 40 grams per 100 grams of the product. In some embodiments, the fat content of the product ranges from 25 grams to 40 grams per 100 grams of the product. In some embodiments, the fat content of the product ranges from 30 grams to 40 grams per 100 grams of the product. In some embodiments, the fat content of the product ranges from 35 grams to 40 grams per 100 grams of the product.

In some embodiments, the fat content of the product ranges from 20 grams to 40 grams per 100 grams of the product. In some embodiments, the fat content of the product ranges from 25 grams to 35 grams per 100 grams of the product.

In some embodiments, the carbohydrate content of the product ranges from 30 grams to 60 grams per 100 grams of the product. In some embodiments, the carbohydrate content of the product ranges from 30 grams to 50 grams per 100 grams of the product. In some embodiments, the carbohydrate content of the product ranges from 30 grams to 45 grams per 100 grams of the product. In some embodiments, the carbohydrate content of the product ranges from 30 grams to 40 grams per 100 grams of the product. In some embodiments, the carbohydrate content of the product ranges from 30 grams to 35 grams per 100 grams of the product.

In some embodiments, the carbohydrate content of the product ranges from 35 grams to 60 grams per 100 grams of the product. In some embodiments, the carbohydrate content of the product ranges from 40 grams to 60 grams per 100 grams of the product. In some embodiments, the carbohydrate content of the product ranges from 45 grams to 60 grams per 100 grams of the product. In some embodiments, the carbohydrate content of the product ranges from 50 grams to 60 grams per 100 grams of the product. In some embodiments, the carbohydrate content of the product ranges from 55 grams to 60 grams per 100 grams of the product.

In some embodiments, the carbohydrate content of the product ranges from 40 grams to 50 grams per 100 grams of the product.

Acoustic Crispiness Test Procedure

Collect ten samples of the test product. Cut each of the ten samples using a craft knife blade (A/CKB, Stable Micro Systems, Godalming, UK). The test settings for the craft knife blade are: test speed 1 mm/s, target strain of 90% and trigger force of 12 g. During the cutting, use an Acoustic Envelope Detector ("AED") (A/RAED, Stable Micro Systems, Godalming, UK) to collect acoustic data. The test settings for the AED are: gain of 1 (equal to 6 dB), switched to filter and signal. The microphone of the AED (Type 4188-A-021, Brüel & Kjær, Nærum, Denmark) is calibrated to 94 dB and 114 dB using a sound calibrator (Type 4231, Brüel & Kjær, Nærum, Denmark). The microphone is positioned 2 cm from the center of the craft knife blade at an angle of −45° from the flat edge of the blade during testing. Collect the acoustic data at 500 points/second. Collect acoustic data for each the ten samples of the test product. Compile and analyze the acoustic data to identify the average number of acoustic peaks of the ten samples. The average number of acoustic peaks corresponds to the acoustic peak count of the test product.

Force Crispiness Test Procedure

Collect ten samples of the test product. Cut each of the ten samples using a craft knife blade (A/CKB, Stable Micro Systems, Godalming, UK). The test settings for the craft knife blade are: test speed 1 mm/s, target strain of 90% and trigger force of 12 g. During the cutting, use a TA-XT2 Texture Analyser (Stable Micro Systems, Godalming, UK) with a 5 kg load cell to measure force. Collect the force data at 500 points/second. Collect force data for each the ten samples of the test product. Compile and analyze the force data to identify the average peak force of the ten samples. The average peak force corresponds to the peak fracture force of the test product.

Methods of Making the Products

In embodiments, the method of making the product includes first adding a plurality of alternating wet and dry coating layers on an inner portion wherein the wet coating layers may include molasses, water, and/or salt and the dry coating may include the legume-based flour, starch, and/or baking soda. In the embodiments, the inner portion may include any constituents detailed herein such as legumes and/or creamy component. After the coating step, the coated inner portion is heated to a sufficient temperature to form a crispy outer shell. In an embodiment, the heating temperature is 350 degrees Fahrenheit. Next, an optional coating of seasonings and/or palm oil may be added before or after heating the coated inner portion. In embodiments, an additive comprising vitamins and/or minerals may be added to the inner portion or the coating before or after the heating step.

In some embodiments, the product is not formed by an extrusion process. In other embodiments, the layers of the outer shell are added directly to the inner portion without any protective coating over the inner portion.

FIG. 1 shows a process for making the product according to an embodiment of the present invention. In the embodiment shown in FIG. 1, the inner portion is roasted/cooked 100 at a temperature of about 300 degrees Fahrenheit to about 410 degrees Fahrenheit. The product of step 100 is then coated using, in an embodiments, molasses, water, legume and starch, in a coating step 110. The coating may be applied in alternating wet and dry layers during the coating step 110. After the coating step 110, the coated product is then roasted 120 at a temperature of about 300 degrees Fahrenheit to about 410 degrees Fahrenheit, and then cooled 130. A seasoning is then sprayed onto the product of 130 in the seasoning application step 140. The resultant product is then stored in step 150.

NON-LIMITING EXAMPLES

Non-limiting examples of products according to embodiments of the present invention are detailed below. Unless otherwise noted, the examples were produced using the process detailed in FIG. 1.

Example 1

Example 1 includes a roasted plain soy bean inner portion and an outer shell comprising alternating dry and wet layers having the composition shown in Table 2. The coated product was baked at 350 degrees Fahrenheit for 10 minutes and vibrated every 2-3 minutes during heating.

Example 2

Example 2 includes a roasted honey soy bean inner portion and an outer shell comprising alternating dry and wet layers having the composition shown in Table 2. The coated product was subject to the same heating/vibration detailed in Example 1.

Example 3

Example 3 includes a roasted honey soy bean inner portion and an outer shell comprising alternating dry and wet layers having the composition shown in Table 2. The coated product was subject to the same heating/vibration detailed in Example 1.

Example 4

Example 4 includes a chick pea based lentil inner portion and an outer shell comprising alternating dry and wet layers having the composition shown in Table 2. The coated product was subject to the same heating/vibration detailed in Example 1. In this example, the weight percentages of the dry layers and the wet layers in the outer shell were 63% and 37%, respectively. In the final product, the weight percentages of the outer shell and the inner portion are 73% and 27%, respectively.

TABLE 2

| Example | Dry Layer Composition | Wet Layer Composition | Inner Portion |
|---|---|---|---|
| 1 | 22% ultracrisp starch<br>74% chick pea flour<br>4% baking soda | 18.5% water<br>80% molasses<br>1.5% salt | Roasted Plain Soy Bean |
| 2 | 47% peanut flour (12% fat - medium roast)<br>47% chick pea flour<br>6% baking soda | 19% water<br>80% corn syrup - 63 DE<br>1% salt | Roasted Honey Soy Bean |
| 3 | 48% peanut flour (12% fat - medium roast)<br>48% chick pea flour<br>4% baking soda | 19% water<br>79% corn syrup - 63 DE<br>2% salt | Roasted Honey Soy Bean |
| 4 | 22% ultracrisp starch<br>74% chick pea flour<br>4% baking soda | 18.5% water<br>80% molasses<br>1.5% salt | Chick Pea Based Lentil (65% Chick Pea Flour) |

Example 5 is a product having a soy bean inner portion and a legume coating. Example 5 exhibits the characteristics shown in Table 3 below:

TABLE 3

| Description | by weight/100 g |
|---|---|
| Moisture | 9.7 g |
| Energy (kcal) - US | 392.3 cal |
| Calories From Fat (Total) | 121.9 cal |
| Protein | 22.2 g |
| Fat Total | 13.5 g |

TABLE 3

| Description | by weight/100 g |
|---|---|
| Fat Saturates Total | 1.9 g |
| Trans Fatty Acids Total | 0.0007 g |
| Cholesterol | 0 mg |
| Carbohydrate Total | 48.8 g |
| Sugars (Mono & Di-saccharides) Total | 16.5 g |
| Sodium | 411.5 mg |
| Calcium | 122.4 mg |
| Salt Equivalent | 1.0 g |
| Fibre Dietary Total AOAC | 11.1 g |

Example 6 included a product having a soy bean inner portion and a legume coating. Example 6 exhibits the characteristics shown in Table 4 below:

TABLE 4

| Description | by weight/100 g |
|---|---|
| Moisture | 11.9 g |
| Energy (kcal) - US | 436.5 kcal |
| Calories From Fat (Total) | 180.1 kcal |
| Protein | 12.7 g |
| Fat Total | 20 g |
| Fat Saturates Total | 16.5 g |
| Trans Fatty Acids Total | 0.1 g |
| Cholesterol | 0 mg |
| Carbohydrate Total | 50.7 g |
| Sugars (Mono & Di-saccharides) Total | 17.8 g |
| Sodium | 428.9 mg |
| Calcium | 72.0 mg |
| Salt Equivalent | 1.1 g |
| Fibre Dietary Total AOAC | 6.2 g |

Examples 7-9 are non-limiting examples of an inner portion having the compositions shown in Table 5. The examples are identical except for the type of legume-based flour:

TABLE 5

| Ingredient | Amount per 100 kg | Unit |
|---|---|---|
| Yellow Pea (Example 7), Chickpea (Example 8) or Fava Bean (Example 9) Flour Extruded | 61.4 | kg |
| Veg Fat General Purpose Soft | 32.8 | kg |
| Sugar Granulated | 5.0 | kg |
| Vitamin Additives | 0.6 | kg |
| Salt Fine | 0.2 | Kg |

Example 10 is a non-limiting example of an inner portion having the composition shown in Table 6.

TABLE 6

| Ingredient | Amount per 100 kg | Unit |
|---|---|---|
| Legume-Based Flour | 50-100 | kg |
| Fat | 20-60 | kg |
| Sugar | 2-10 | kg |

TABLE 6-continued

| Ingredient | Amount per 100 kg | Unit |
|---|---|---|
| Vitamin Additive | 0.1-2 | kg |
| Salt | 0.1-1 | kg |

While a number of embodiments of the present invention have been described, it is understood that these embodiments are illustrative only, and not restrictive, and that many modifications may become apparent to those of ordinary skill in the art. Further still, the various steps may be carried out in any desired order (and any desired steps may be added and/or any desired steps may be eliminated).

The invention claimed is:

1. A product comprising:
an outer shell comprising at least one first legume; and
an inner portion comprising at least one second legume;
wherein the at least one first legume is different from the at least one second legume;
wherein the outer shell comprises at least a first layer and a second layer;
wherein the first layer is different from the second layer;
wherein the product is a ready-to-eat food; and
wherein the outer shell is crispy.

2. The product of claim 1, wherein the at least one first legume is a pulse.

3. The product of claim 1, wherein the at least one first legume is selected from the group consisting of chickpea, green pea, yellow pea, black eyed peas, pinto bean, kidney bean, black bean, mung bean, adzuki bean, fava bean, edamame, green lentil, red lentil, black lentil, lupin, and combinations thereof.

4. The product of claim 1, wherein the at least one first legume is soya.

5. The product of claim 1, wherein the at least one second legume is a pulse.

6. The product of claim 1, wherein the at least one second legume is selected from the group consisting of chickpea, green pea, yellow pea, black eyed peas, pinto bean, kidney bean, black bean, mung bean, adzuki bean, fava bean, edamame, green lentil, red lentil, black lentil, lupin, and combinations thereof.

7. The product of claim 1, wherein the at least one second legume is soya.

8. The product of claim 1, wherein the inner portion is creamy.

9. The product of claim 1, wherein the inner portion further comprises at least one binding agent.

10. The product of claim 1, wherein the outer shell comprises at least one of molasses, jaggery, water, salt, starch, or baking soda.

11. The product of claim 1, wherein at least one of the outer shell and the inner portion further comprises at least one first additive selected from the group consisting of iron, vitamins A, B1, B2, B6, B12, C, D, D3, folic acid, thiamine, riboflavin, niacin, zinc, and combinations thereof.

12. The product of claim 1, wherein the product has a shelf life of at least 12 months.

13. The product of claim 1, wherein the product is substantially free of at least one of high fructose corn syrup, dairy-based components, enzymes or gluten.

14. A product comprising:
an outer shell comprising at least one first legume; and
an inner portion comprising at least one second legume selected from the group consisting of chickpea, green pea, yellow pea, black eyed peas, pinto bean, kidney bean, black bean, mung bean, adzuki bean, fava bean, edamame, green lentil, red lentil, black lentil, lupin, and combinations thereof;
wherein the at least one first legume is different from the at least one second legume;
wherein the outer shell comprises at least a first layer and a second layer;
wherein the first layer is different from the second layer;
wherein the product is a ready-to-eat food;
and wherein the outer shell is crispy.

15. The product of claim 14, wherein the inner portion further comprises a creamy component;
wherein the creamy component comprises:
i) a legume-based flour of the at least one second legume and
ii) at least one binding agent.

16. The product of claim 15, wherein the at least one binding agent is palm oil.

17. The product of claim 14, wherein the outer shell further comprises at least one first additive selected from the group consisting of iron, vitamins A, B1, B2, B6, B12, C, D, D3, folic acid, thiamine, riboflavin, niacin, zinc, and combinations thereof.

18. The product of claim 14, wherein the inner portion further comprises at least one second additive selected from the group consisting of iron, vitamins A, B1, B2, B6, B12, C, D, D3, folic acid, thiamine, riboflavin, niacin, zinc, and combinations thereof.

* * * * *